US009570987B2

(12) United States Patent
Trinh et al.

(10) Patent No.: US 9,570,987 B2
(45) Date of Patent: Feb. 14, 2017

(54) METHOD AND APPARATUS FOR A VOLTAGE CONVERTER HAVING BIDIRECTIONAL POWER CONVERSION CELLS

(71) Applicants: INSTITUT POLYTECHNIQUE DE GRENOBLE, Grenoble (FR); CENTRE NATIONAL DE LA RECHERCHE SCIENTIFIQUE, Paris (FR); UNIVERSITE JOSEPH FOURIER, Grenoble (FR)

(72) Inventors: Hieu Trinh, Saint Martin d'Heres (FR); Nicolas Rouger, Grenoble (FR); Jean-Christophe Crebier, Grenoble (FR); Yves Lembeye, Saint Georges de Commiers (FR)

(73) Assignees: Institute Polytechnique de Grenoble, Grenoble (FR); Centre National de la Recherche Scientifique, Paris (FR); Univeriste Joseph Fourier, Grenoble (FR)

( * ) Notice: Subject to any disclaimer, the term of this patent is extended or adjusted under 35 U.S.C. 154(b) by 173 days.

(21) Appl. No.: 14/380,126

(22) PCT Filed: Feb. 22, 2013

(86) PCT No.: PCT/FR2013/050367
§ 371 (c)(1),
(2) Date: Aug. 21, 2014

(87) PCT Pub. No.: WO2013/124595
PCT Pub. Date: Aug. 29, 2013

(65) Prior Publication Data
US 2015/0029761 A1 Jan. 29, 2015

(30) Foreign Application Priority Data

Feb. 22, 2012 (FR) ..................... 12 51601

(51) Int. Cl.
H02M 3/335 (2006.01)
H02M 1/36 (2007.01)
H02M 1/00 (2006.01)

(52) U.S. Cl.
CPC ........... *H02M 3/33507* (2013.01); *H02M 1/36* (2013.01); *H02M 3/33584* (2013.01); *H02M 2001/0074* (2013.01)

(58) Field of Classification Search
CPC ..................... H02M 2001/0074; H02M 3/285; H02M 3/33584; H02M 2007/4835; H02M 2001/0067; H02M 3/33592; H02J 2001/002; H02J 1/102
See application file for complete search history.

(56) References Cited

U.S. PATENT DOCUMENTS

2005/0270812 A1* 12/2005 Vinciarelli ............ H02M 3/157
363/65
2006/0233000 A1* 10/2006 Akagi ................. H02M 5/4585
363/37

(Continued)

FOREIGN PATENT DOCUMENTS

DE 19827872 A1 12/1999

*Primary Examiner* — Harry Behm
(74) *Attorney, Agent, or Firm* — The Noblitt Group, PLLC

(57) ABSTRACT

The invention relates to a voltage converter (100), including: a plurality of two-way conversion cells (303), each cell comprising a primary circuit (307, Wp), and a secondary circuit (308, Ws) that is insulated from the primary circuit, wherein each circuit can be separately activated in order to supply an output voltage from the converter; and at least one control circuit (306) configured to, in a first operating mode, control the activated cells in order to transfer electrical energy from the primary circuit to the secondary circuit, and control the inactivated cells in order to transfer electrical energy from the secondary circuit to the primary circuit.

17 Claims, 2 Drawing Sheets

(56) References Cited

U.S. PATENT DOCUMENTS

2010/0117593 A1\* 5/2010 Piccard ............... B60L 11/1864
 320/104
2010/0314937 A1 12/2010 Jacobson et al.
2011/0235221 A1\* 9/2011 Vogeli .................... H02M 1/32
 361/18

\* cited by examiner

METHOD AND APPARATUS FOR A VOLTAGE CONVERTER HAVING BIDIRECTIONAL POWER CONVERSION CELLS

BACKGROUND

The present disclosure relates to D.C.-to-D.C. voltage converters, and more particularly aims at a configurable converter comprising a plurality of elementary conversion cells capable of being individually activated to take part in the provision of an output voltage. Converters where the operation of the elementary conversion cells is based on the carrying out of cycles of power transfer between the primary and secondary windings of an insulating transformer are here more particularly considered.

DISCUSSION OF THE RELATED ART

A configurable voltage converter comprising a plurality of elementary conversion cells having identical or different transformation ratios, the cells being capable of being individually activated to take part in the conversion of a D.C. input voltage into a A.C. output voltage, has already been provided, for example, in patent application US2007/0159862. The total transformation ratio of the converter depends on the selection of the activated cells. This type of converter has the advantage of being able of accept a wide variety of input voltage ranges and/or of being able to provide a wide variety of output voltage ranges.

In practice, dynamically reactivating a cell which has previously been disconnected without stopping the converter operation appears to be likely to raise a number of issues. Indeed, in a configurable multiple-cell converter, each elementary cell generally comprises an input capacitive element between its input terminals. When the cell is disconnected, the input capacitive element of this cell tends to discharge, for example, due to leakages inevitably present in its dielectric space, which may result in unwanted voltage or current peaks when the cell is reactivated. Further, if the input capacitive element of the cell is totally discharged, for example, when the cell has remained disconnected for a long period, it may be impossible to reactivate the cell without inputting power from an external source (cell restarting).

As a result, configurable converters generally comprise at least one secondary power supply, specifically dedicated to maintaining an appropriate charge level in the capacitive input elements of the non-activated cells. More generally, configurable converters comprise at least one secondary power supply to reactivate disconnected cells. This increases the complexity, the bulk, and the cost of converters.

SUMMARY

Thus, an object of an embodiment of the present invention is to provide a configurable converter comprising a plurality of elementary conversion cells capable of being individually activated to take part in the provision of an output voltage, such a converter overcoming at least partly some of the disadvantages of known converters.

An object of an embodiment of the present invention is to provide a converter which does not require using an external power supply source to reactivate cells which have been deactivated.

An object of an embodiment of the present invention is to provide a converter which does not require using an external power source to solve reconfiguration problems due to the discharge of the input capacitive elements of the elementary conversion cells which do not take part in the provision of the output voltage.

An object of an embodiment of the present invention is to provide a converter having a structure enabling to satisfactorily optimize the conversion performance, and particularly the quality factor and the power efficiency, whatever the configuration of the converter.

Thus, an embodiment of the present invention provides a voltage converter, comprising: a plurality of bidirectional conversion cells, each cell comprising a primary circuit and a secondary circuit isolated from the primary circuit, and being capable of being individually activated to take part in the provision of an output voltage of the converter; and at least one control circuit configured to, in a first operating mode, simultaneously control activated cells to transfer electric power from the primary circuit to the secondary circuit, and non-activated cells to transfer electric power from the secondary circuit to the primary circuit.

According to an embodiment of the present invention, the primary circuits are series-connected between first and second terminals of the converter and the secondary circuits are connected in parallel between third and fourth terminals of the converter.

According to an embodiment of the present invention, the control circuit is further configured to, in a second operating mode, control the activated cells and the non-activated cells to transfer electric power from the secondary circuit to the primary circuit.

According to an embodiment of the present invention, each cell further comprises an input capacitive element between first and second input terminals of the cell, on the primary circuit side.

According to an embodiment of the present invention, each cell comprises activation switches, and a circuit for driving the activation switches powered with the voltage across said input capacitive element.

According to an embodiment of the present invention, each cell further comprises an output capacitive element between first and second output terminals of the cell, on the secondary circuit side.

According to an embodiment of the present invention, the primary and secondary circuits of each cell respectively comprise a primary winding and a secondary winding coupled to each other.

According to an embodiment of the present invention, the primary circuit of each cell comprises four chopper switches assembled as a full bridge, the primary winding connecting the midpoints of the two arms of the bridge.

According to an embodiment of the present invention, each cell further comprises a circuit for driving the chopper switches of the primary circuit, powered with the voltage across said input capacitive element.

According to an embodiment of the present invention, the secondary circuit of each cell comprises four chopper switches assembled as a full bridge, the secondary winding connecting the midpoints of the two arms of the bridge.

Another embodiment of the present invention provides a component comprising a plurality of converters of the above-mentioned type, the component having at least four connection elements per converter, respectively connected to first, second, third, and fourth terminals of the converter.

Another embodiment of the present invention provides a method of controlling a voltage converter comprising a plurality of bidirectional conversion cells, each cell comprising a primary circuit and a secondary circuit isolated from the primary circuit, and being capable of being individually activated to take part in the provision of an output voltage of the converter, the method comprising the step of: simultaneously controlling activated cells to transfer electric power from the primary circuit to the secondary circuit, and non-activated cells to transfer electric power from the secondary circuit to the primary circuit.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

Figure 1:
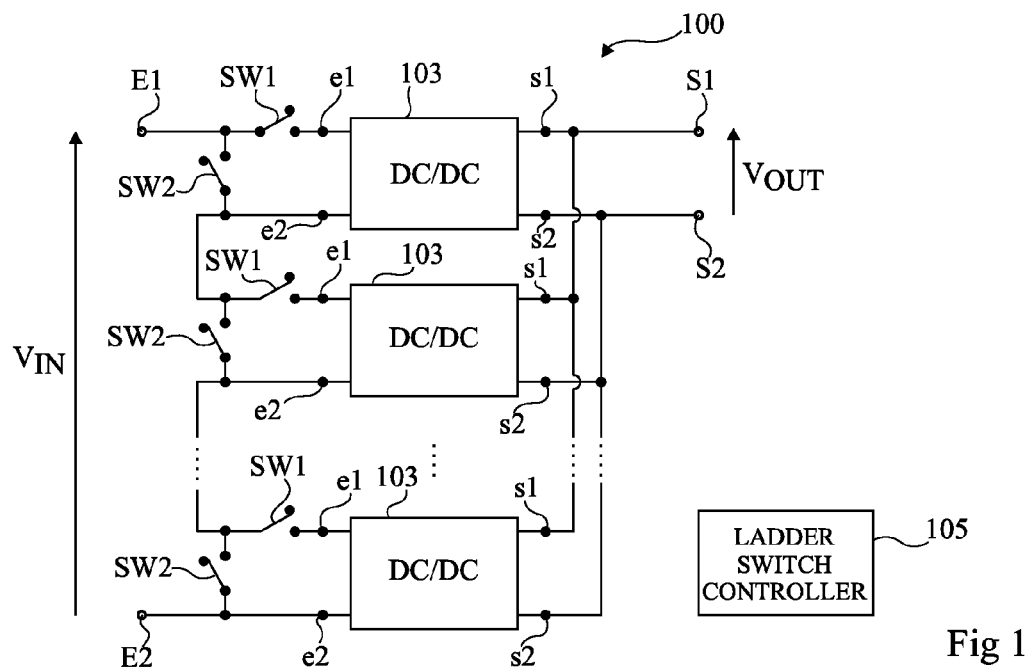
FIG. 1 is a simplified electric diagram of an example of a configurable converter.

For clarity, the same elements have been designated with the same reference numerals in the different drawings. Further, only those elements which are useful to the understanding of the present invention have been shown and described. In particular, the various uses that can be made of the described configurable converters have not been mentioned, such converters being compatible with all known uses of D.C.-to-D.C. voltage converters.

FIG. 1 is a simplified diagram of an example of a converter 100 of the type described in above-mentioned patent application US2007/0159862, comprising a plurality of elementary D.C.-to-D.C. conversion cells 103. The operation of elementary cells 103 is based on the carrying out of cycles of power transfer between the primary and secondary windings of an isolation transformer. Each cell is capable of being individually activated to take part in the conversion of an input voltage $v_{IN}$ applied between input terminals E1 and E2 of the converter into an output voltage $v_{OUT}$ delivered between output terminals S1 and S2 of the converter.

Each cell 103 comprises two input terminals e1 and e2, and two output terminals s1 and s2. The inputs of cells 103 are series-connected between input terminals E1 and E2 of the converter. More particularly, input terminal e1 of each cell 103 in the series is connected to input terminal e2 of the previous cell 103, input terminal e1 of first cell 103 in the series being connected to input terminal E1 of the converter, and input terminal e2 of last cell 103 in the series being connected to input terminal E2 of the converter. The outputs of cells 103 are connected in parallel between output terminals S1 and S2 of the converter. More particularly, output terminals s1 of the elementary cells are connected to output terminal S1 of the converter, and output terminals s2 of the elementary cells are connected to output terminal S2 of the converter.

Each cell 103 has two associated configuration switches SW1 and SW2 arranged as shown in FIG. 1. Switch SW1 is series-connected with input terminal e1 of the cell, and more particularly between input terminal e1 of the cell and input terminal E1 of the converter for the first cell in the series, and between input terminal e1 of the cell and input terminal e2 of the cell of previous rank in the series for the other cells. Switch SW2 is in parallel with the cell input, and more particularly between terminal e2 and the terminal of switch SW1 which is not connected to terminal e1. A cell 103 is activated, and takes part in the provision of output voltage $v_{OUT}$, when switches SW1 and SW2 associated with this cell are respectively on and off. A cell 103 is disconnected (or deactivated), and does not take part in the provision of output voltage $v_{OUT}$, when switches SW1 and SW2 associated with this cell are respectively off and on.

A circuit 105 for controlling the configuration switches (LADDER SWITCH CONTROLLER) is provided to control the activation or the disconnection (deactivation) of cells 103. Circuit 105 may receive as an input one and/or the other of the images of input and output voltages $v_{IN}$ and $v_{OUT}$ of the converter, and activate or dynamically disconnect (in real time) cells to adjust the total converter transformation ratio to regulate output voltage $v_{OUT}$. In other words, the converter configuration may be controlled by the levels of $v_{IN}$ and/or $v_{OUT}$ to always respect a given voltage set point.

In such a converter, each elementary cell generally comprises an input capacitive element between its input terminals e1 and e2. To be able to reactivate disconnected (non-activated) cells, and more particularly to avoid problems of reconfiguration due to the discharge of the input capacitive elements of the disconnected cells, it is necessary to provide at least one secondary power supply (not shown) to maintain the capacitive elements at an appropriate charge level.

Figure 2:
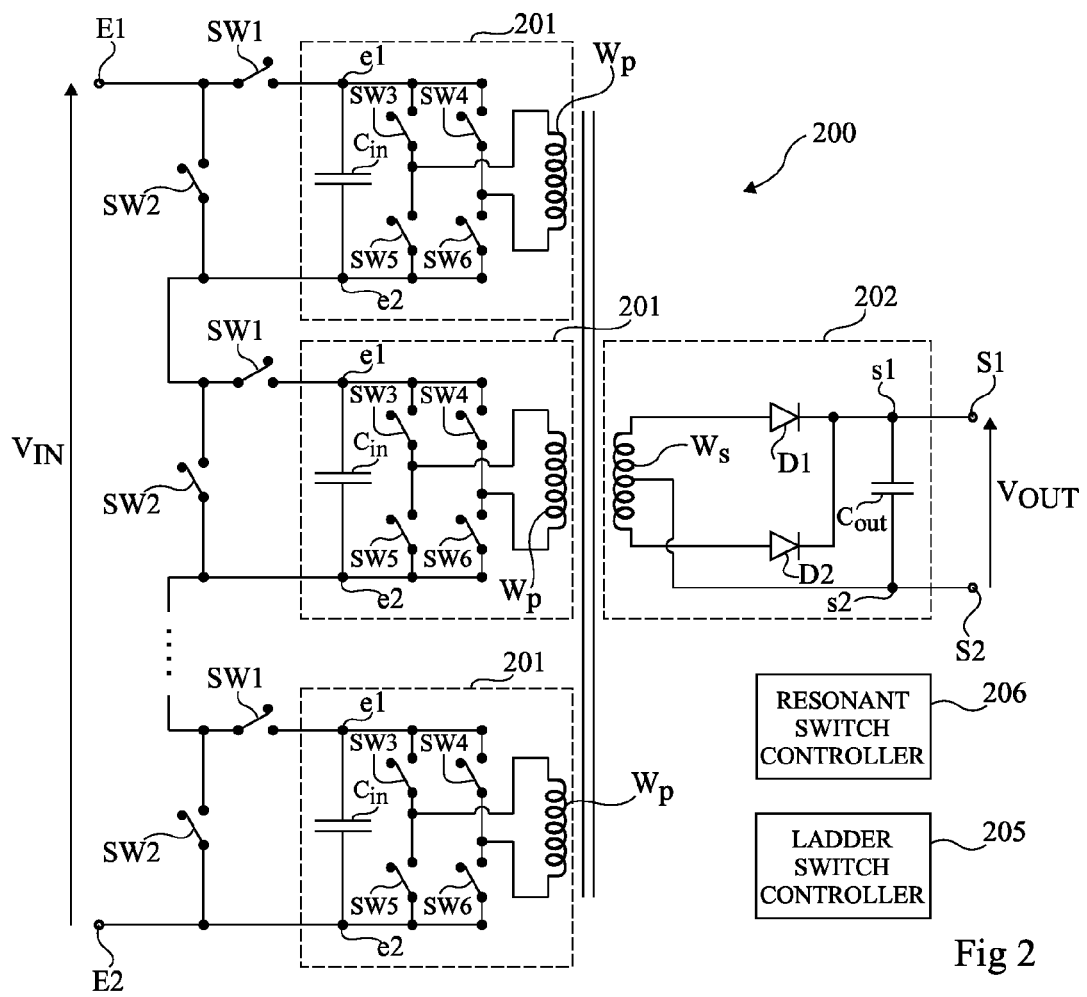
FIG. 2 is an electric diagram of another example of a configurable converter.

FIG. 2 is a diagram illustrating another example of a converter 200 of the type described in the above-mentioned patent application. Converter 200 comprises a plurality of input cells 201 coupled to a single output cell 202.

Each input cell 201 comprises a primary circuit, this circuit comprising a primary winding Wp and four cut-off switches, respectively SW3, SW4, SW5, and SW6 assembled as a full bridge between input terminals e1 and e2 of the cell. Primary winding Wp connects the midpoints of the two arms of the bridge. Capacitive and inductive resonance elements (not shown) may be series-connected with winding Wp between the arms of the bridge to set the resonance frequency of the primary winding. Each cell 201 further comprises a capacitive element $c_{in}$ between its input terminals e1 and e2 to set the input voltage of the primary circuit.

Output cell 202 comprises a secondary circuit, this circuit comprising a secondary winding Ws and a rectifying circuit having its input connected to terminals of secondary winding Ws and having its output connected to output terminals s1 and s2 of cell 202. Secondary winding Ws is magnetically coupled to primary windings Wp of all converter input cells 201. The rectifying circuit is a circuit with two diodes D1 and D2. Output cell 202 further comprises a capacitive element $c_{out}$ between its output terminals s1 and s2.

Input cells 201 are series-connected between input terminals E1 and E2 of the converter (terminals of application of input voltage $v_{IN}$). Output terminals s1 and s2 of output cell 202 are respectively connected to output terminals S1 and S2 of the converter (terminals delivering output voltage $v_{OUT}$). Each input cell 201 has two associated configuration switches SW1 and SW2 arranged as in the example of FIG. 1. As in the example of FIG. 1, an input cell 201 is activated and takes part in the provision of output voltage $v_{OUT}$ when the switches SW1 and SW2 associated with this cell are respectively on and off, and an input cell 201 is disconnected and does not take part in the provision of output voltage $v_{OUT}$ when switches SW1 and SW2 associated with this cell are respectively off and on.

A circuit 205 for controlling configuration switches SW1, SW2 (LADDER SWITCH CONTROLLER) is provided to control the activation or the disconnection of input cells 201. A circuit 206 for controlling chopper switches SW3, SW4, SW5, SW6 (RESONANT SWITCH CONTROLLER) is provided to control the power transfer from the primary circuit of each activated input cell 201 to the common secondary circuit of output cell 202.

When an input cell 201 of converter 200 is disconnected, or non-activated, it is provided to keep on controlling chopper switches SW3, SW4, SW5, and SW6 of this cell to maintain input capacitance $c_{in}$ of the cell at an appropriate charge level, to suppress inrush current problems on reconfiguration of the converter.

However, a disadvantage of converter 200 is due to the fact that this converter comprises a plurality of primary circuits capable of being individually activated, coupled to a single secondary circuit. This inevitably results in significantly altering the conversion performance, and particularly the quality factor and the power efficiency, in certain converter configurations.

Figure 3:
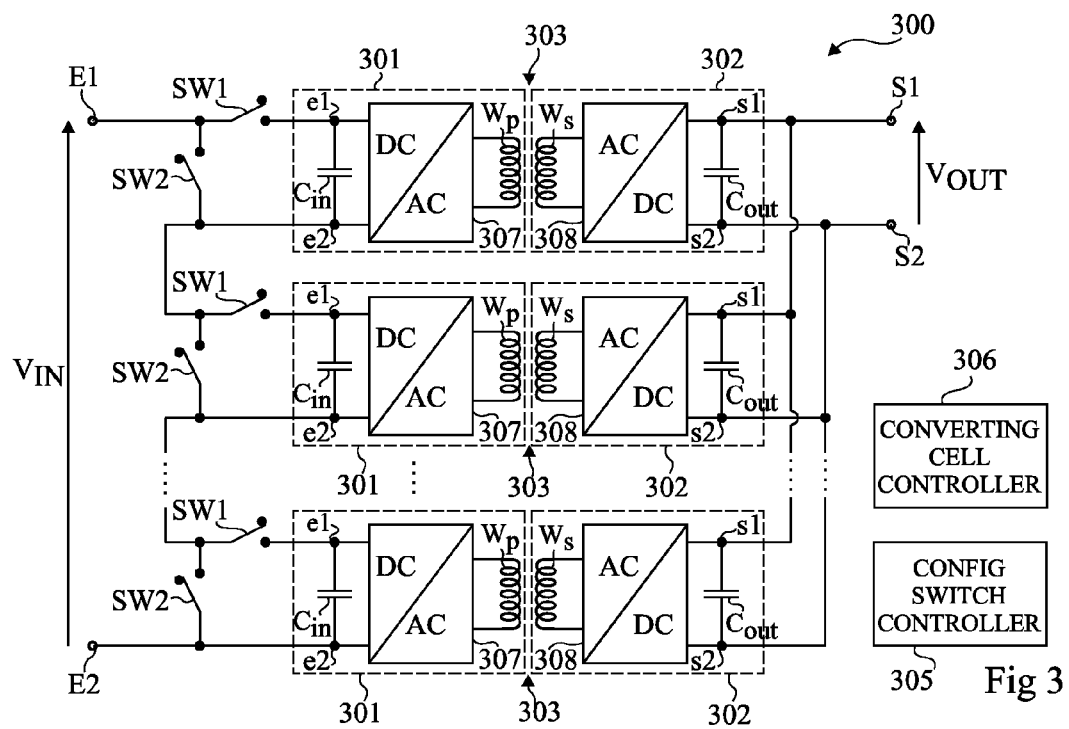
FIG. 3 is a simplified electric diagram of an embodiment of a configurable converter.

FIG. 3 is a simplified electric diagram of an embodiment of a configurable converter 300 comprising a plurality of D.C.-to-D.C. elementary conversion cells 303, that is, at least two cells 303, each cell 303 being capable of being individually activated to take part in the conversion of an input voltage $v_{IN}$ applied between input terminals E1 and E2 of the converter into an output terminal $v_{OUT}$ delivered between output terminals S1 and S2 of the converter.

Each conversion cell 303 comprises an input cell 301 comprising two input terminals e1 and e2, and one output cell 302, coupled to input cell 301, comprising two output terminals s1 and s2. Input cell 301 comprises a primary circuit, this circuit comprising a primary winding Wp of a transformer and a circuit 307 capable of converting a D.C. voltage (DC) received between input terminals e1 and e2 of the cell into a variable voltage (AC) provided across primary winding Wp. Input cell 301 further comprises an input capacitive element $c_{in}$ between its terminals e1 and e2 to set the voltage applied to the input of the primary circuit. Output cell 302 comprises a secondary circuit, this circuit comprising a secondary winding Ws, coupled to primary winding Wp of input cell 301, and a circuit 308 capable of rectifying a variable voltage (AC) received across secondary winding Ws into a D.C. voltage (DC) provided across an output capacitive element $c_{out}$ connected between output terminals s1 and s2 of cell 302.

Thus, unlike converter 200 of FIG. 2 which comprises a plurality of primary circuits coupled to a single secondary circuit, converter 300 comprises a plurality of primary circuits and a plurality of secondary circuits coupled two by two.

Input cells 301 are series-connected between input terminals E1 and E2 of the converter (terminals of application of voltage $v_{IN}$) and output cells 302 are connected in parallel between output terminals S1 and S2 of the converter (terminals of provision of output voltage $v_{OUT}$), for example, as described in the example of FIG. 1. In this example, each conversion cell 303 has two associated configuration switches SW1 and SW2 arranged as in the example of FIG. 1. Thus, a conversion cell 303 is activated to take part in the provision of output voltage $v_{OUT}$ when switches SW1 and SW2 associated with this cell are respectively on and off, and a conversion cell 303 is disconnected or deactivated, and does not take part in the provision of output voltage $v_{OUT}$, when switches SW1 and SW2 associated with this cell are respectively off and on. It should be noted that in the shown example, switches SW1 are connected to input terminals e1 of the corresponding cells. As a variation, it may be provided to connect series switches SW1 to input terminals e2 of the cells (that is, on the bottom input branch of the cells in the diagram of FIG. 3, rather than on the top input branch).

A circuit 305 for controlling the configuration switches (CONFIG SWITCH CONTROLLER) is provided to control the activation or the disconnection of elementary conversion cells 303. A circuit 306 for controlling the elementary cells (CONVERTING CELL CONTROLLER) is provided to control the power transfer from the primary circuit to the secondary circuit of the activated cells, to take part in the provision of output voltage $v_{OUT}$.

According to an aspect of an embodiment, elementary conversion cells 303 are bidirectional, that is, each cell 303 can be controlled either to transfer power from the primary circuit to the secondary circuit when a D.C. voltage source is applied between its terminals e1 and e2, or to transfer power from the secondary circuit to the primary circuit when a D.C. voltage source is applied between its terminals s1 and s2. In other words, circuit 308 of an elementary conversion cell is not only capable of rectifying a variable voltage (AC) received across secondary winding Ws into a D.C. voltage (DC) provided between output terminals s1 and s2 of the cell, but may further be controlled to convert a D.C. voltage (DC) applied between terminals s1 and s2 of the cell into a variable voltage (AC) provided across secondary winding Ws. Further, circuit 307 of an elementary conversion cell is not only capable of converting a D.C. voltage (DC) received between its terminals e1 and e2 into a variable voltage (AC) provided across primary winding Wp, but may further be controlled to rectify a variable voltage (AC) received across primary winding Wp into a D.C. voltage (DC) provided between input terminals e1 and e2 of the cell.

According to another aspect of an embodiment, it is provided to control the cells 303 which do not take part in the provision of output voltage $v_{OUT}$ (disconnected cells) to transfer electric power from their secondary circuit to their primary circuit in order to maintain an appropriate charge level between input capacitive elements $c_{in}$ of the deactivated cells 303. In this example, circuit 306 is configured not only to control the activated cells to transfer power from their primary circuit to their secondary circuit, but also to control the disconnected cells to transfer power from their secondary circuit to their primary circuit. In other words, control circuit 306 is configured to, in a same operating mode, simultaneously control activated cells to transfer electric power from the primary circuit to the secondary circuit, and non-activated cells to transfer electric power from the secondary circuit to the primary circuit.

An advantage of converter 300 is that it enables to maintain at an appropriate charge (or voltage) level input capacitive elements $c_{in}$ of the elementary cells which do not take part in the provision of the output voltage, which avoids problems of converter reconfiguration, without for all this providing an external power supply specifically dedicated to this function.

Another advantage of converter 300 is that each elementary conversion cell 303 comprises its own primary circuit and its own secondary circuit coupled to each other. The conversion performance, and particularly the quality factor and the power efficiency, can thus be optimized cell by cell. This provides, at least in certain configurations of the converter, a much better performance than in a converter of the type described in relation with FIG. 2, comprising a single secondary circuit coupled to a plurality of primary circuits.

Another advantage of converter 300 is that it is fully bidirectional. In particular, a usage mode of converter 300 may be provided where all conversion cells 303, be they activated or not, are controlled to transfer power from their secondary circuit to their primary circuit, to convert a D.C. input voltage applied between terminals S1 and S2 of the converter into a D.C. output voltage provided between terminals E1 and E2 of the converter. In this case, as in the previously-described usage mode, the activated cells take part in the provision of the output voltage and transfer an amount of power which particularly depends on the load (not shown) powered by the converter, and the disconnected cells do not take part in the provision of the output voltage and only transfer the amount of power necessary to maintain the charge of input capacitive element $c_{in}$.

In a preferred embodiment, configuration switches SW1 and SW2 of each cell are integrated on an integrated circuit chip together with other elements of the cell, for example, together with chopper elements of the cell. This chip may further comprise amplification circuits to guarantee a sharp switching and with the least possible losses of switches SW1 to SW6. The chip may also comprise control circuits implementing functions of control of the cell transformation coefficient, of control of the current level in the cell, and/or of control of the flow direction of the current in the cell, for example, by varying the phase-shift of the cell chopper switches. This chip, and particularly the amplification and control circuits associated with switches SW1 to SW6 (also called circuits for closely controlling switches SW1 to SW6), may be powered with the power stored in capacitor $c_{in}$ of the cell (that is, with the voltage between terminals e1 and e2). In this case, the circuits external to the cell, that is, circuits 305 and 306 in the shown example, only provide the cell with control signals (activation or not of the cell, cell operating direction, value of the transformation coefficient or of the current level in the cell, etc.). In other words, all or part of circuit 306 (CONVERTING CELL CONTROLLER) can be locally transferred into cells 303, and powered with the power stored in capacitors $c_{in}$. In an embodiment, the transformation coefficient of the disconnected converter cells (cells transferring power from their secondary circuit to their primary circuit) may be selected to maintain the voltage between terminals e1 and e2 of the cell deactivated at an optimal value enabling to efficiently reactive the cell (particularly to maintain an optimal biasing of configuration switch SW2 which short-circuits the primary stage of the cell).

Figure 4:
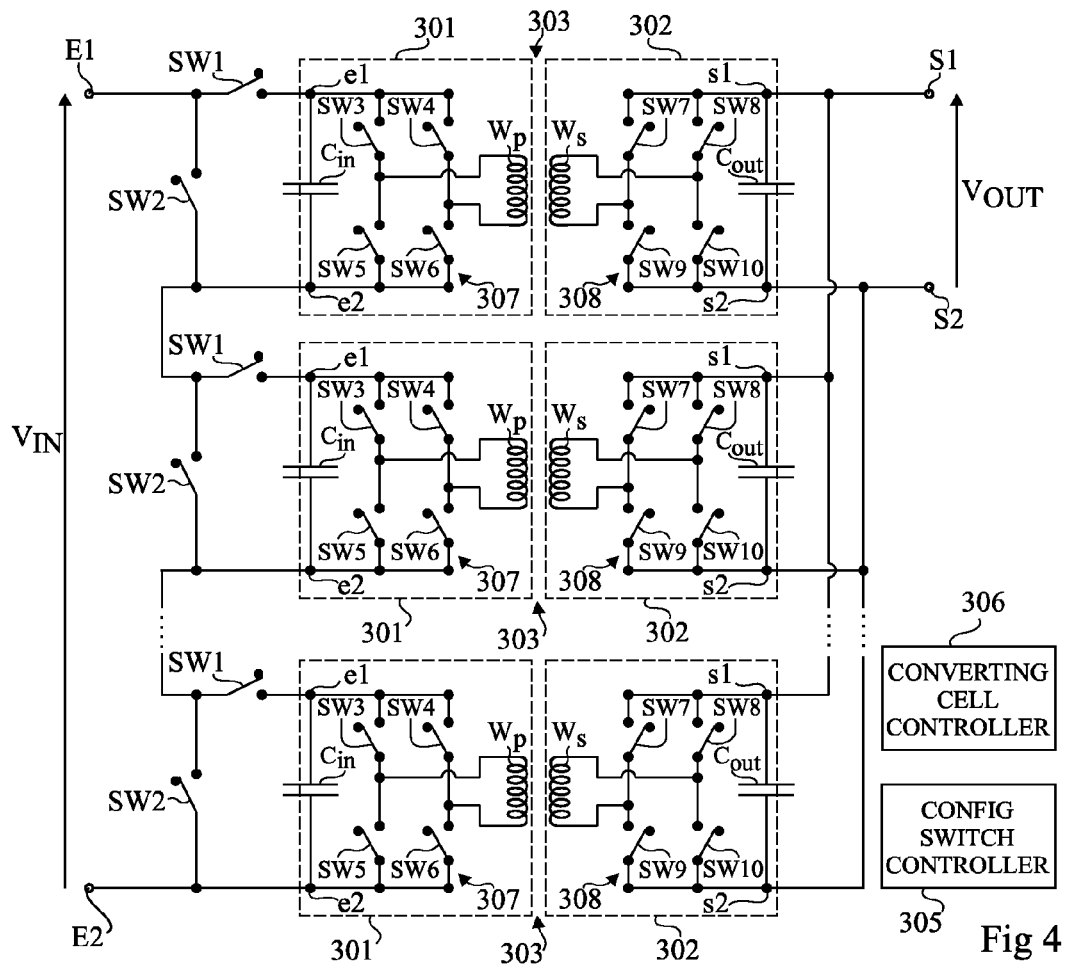
FIG. 4 is a more detailed electric diagram of an embodiment of a configurable converter of the type described in relation with FIG. 3.

FIG. 4 is an electric diagram showing in more detailed fashion an embodiment of a configurable converter 400 of the type described in relation with FIG. 3. In particular, as compared with FIG. 3, control circuits 307 and 308 of the primary and secondary stages of the elementary conversion cells have been detailed. The elements already described in relation with FIG. 3 will not be detailed again hereafter.

In each elementary conversion cell 303, primary stage control circuit 307 comprises four chopper switches SW3, SW4, SW5, and SW6, assembled as a full bridge between input terminals e1 and e2 of the cell. Primary winding Wp connects the midpoints of the two arms of the bridge. Capacitive and inductive resonance elements (not shown) may be series-connected with winding Wp to set the resonance frequency of the primary circuit. Further, in each cell 303, secondary stage control circuit 308 comprises four chopper switches SW7, SW8, SW9, and SW10, assembled as a full bridge between output terminals s1 and s2 of the cell. Secondary winding Ws connects the midpoints of the two arms of the bridge. Capacitive and inductive resonance elements (not shown) may be series-connected with winding Ws to set the resonance frequency of the secondary circuit.

Switches SW1 to SW10 are two-way current switches, for example, MOS transistors. Switches SW3 to SW6 of circuit 307 may be controlled either to convert a D.C. input voltage applied between terminals e1 and e2 of cell 303 into a variable voltage provided across primary winding Wp (power transfer from the primary to the secondary), or to rectify a variable voltage received across primary winding Wp into a D.C. voltage provided between terminals e1 and e2 of cell 303 (power transfer from the secondary to the primary). Further, switches SW7 to SW10 of circuit 308 may be controlled either to rectify a variable voltage received across secondary winding Ws into a D.C. voltage provided between terminals s1 and s2 of cell 303 (power transfer from the primary to the secondary), or to convert a D.C. voltage applied between terminals s1 and s2 of cell 303 into a variable voltage provided across secondary winding Ws (power transfer from the secondary to the primary). It should be noted that in the absence of a sufficient power to properly control the switching of switches SW1 to SW6 or SW7 to SW10, for example, in a converter power-on phase, the rectifications and power transfers are performed via the diodes intrinsic to the MOS transistors.

As an example, to reverse the power transfer direction in an elementary cell 303, control circuit 306 may be configured to vary the phase-shift between the switchings of the switches of the primary and the switchings of the switches of the secondary. Control circuit 306 may also be configured to vary the switching frequency and/or the switching duty cycle of chopper switches SW3 to SW10. It should be noted that by varying one or a plurality of the above-mentioned parameters (phase shift, frequency, and duty cycle), it is possible to adjust the transformation ratio of an elementary cell around a nominal transformation ratio. This provides an additional possibility of setting the converter. In other words, the transformation coefficient or the current ratio of each cell is individually settable. As an example, a phase reference may be defined for each cell by the secondary circuit of the cell, and the cell may be set by varying the phase shift of the switches of the primary with respect to the switches of the secondary. In this case, it may be provided for the secondary circuits of the converter to all operate in phase or, as a variation to operate with a phase shift (which eases possible control signal filtering operations).

Specific embodiments of the present invention have been described. Various alterations, modifications, and improvements will readily occur to those skilled in the art.

In particular, the invention is not limited to the example of elementary cell 303 described in relation with FIG. 4. More generally, it will be within the abilities of those skilled in the art to form a converter of the type described hereabove whatever the structure of the elementary cell, provided that each elementary cell comprises a primary circuit and a secondary circuit coupled to each other and forming a transformer isolating the input terminals of the cell from its output terminal, and that each cell is bidirectional in terms of current.

Further, to increase the conversion possibilities offered by a single component, it will be within the abilities of those skilled in the art to form a component comprising a plurality of configurable converters of the type described in relation with FIGS. 3 and 4, this component comprising two input terminals and two output terminals for each converter, and at least one control circuit for controlling the configuration and chopper switches of the converters. It should be noted that the component may comprise one control circuit per converter, or a control circuit common to all converters. As a variation, the control circuit may be external to the component and control converters of one or a plurality of components. The choice of associating or not the converters and the way to associate them (series or parallel at the input, series or parallel at the output) may be left to the user, and the associations may for example be made by soldering contact elements of the component (a contact element may be a connection pad, a contact bump, or any other known connection element).

The invention claimed is:

1. A voltage converter comprising:
   a plurality of bidirectional conversion cells, each cell comprising:
      a primary circuit;
      a secondary circuit isolated from the primary circuit, and being capable of being individually and dynamically activated or deactivated via at least one activation switch of the cell to adjust the transformation ratio of the voltage controller;
      an input capacitive element between a first input terminal and a second input terminal of the cell, on the primary circuit side; and
      a configuration circuit for driving the at least one activation switch powered with the voltage across said input capacitive element; and
   at least one control circuit configured to, in a first operating mode, simultaneously control activated cells to transfer electric power from the primary circuit to the secondary circuit, and non-activated cells to transfer electric power from the secondary circuit to the primary circuit.

2. The converter of claim 1, wherein the primary circuits are series-connected between a first terminal and a second terminal of the converter and the secondary circuits are connected in parallel between a third terminal and a fourth terminal of the converter.

3. The converter of claim 2, wherein said at least one control circuit is further configured to, in a second operating mode, control the activated cells and the non-activated cells to transfer electric power from the secondary circuit to the primary circuit.

4. The converter of claim 2, wherein:
   each cell further comprises:
      an input capacitive element between a first input terminal and a second input terminal of the cell, on the primary circuit side; and
      an output capacitive element between a first output terminal and a second output terminal of the cell, on the secondary circuit side; and
   the primary and secondary circuits of each cell respectively comprise a primary winding and a secondary winding coupled to each other.

5. A component comprising a plurality of converters of claim 4, the component having at least four connection elements per converter, respectively connected to the first terminal, the second terminal, the third terminal, and the fourth terminal of the converter.

6. The converter of claim 1, wherein each cell further comprises an output capacitive element between a first output terminal and a second output terminal of the cell, on the secondary circuit side.

7. The converter of claim 1, wherein the primary and secondary circuits of each cell respectively comprise a primary winding and a secondary winding coupled to each other.

8. The converter of claim 7, wherein the secondary circuit of each cell comprises a second set of four chopper switches assembled as a second full bridge, the secondary winding connecting the midpoints of the two arms of the second full bridge.

9. The converter of claim 7, wherein the primary circuit of each cell comprises a first set of four chopper switches assembled as a first full bridge, the primary winding connecting the midpoint of the two arms of the first full bridge.

10. The converter of claim 9, wherein:
    each cell further comprises a first circuit from among the at least one control circuit for driving the chopper switches of the primary circuit, powered with the voltage across said input capacitive element.

11. The converter of claim 10, wherein:
    the secondary circuit of each cell comprises a second set of four chopper switches assembled as a second full bridge, the secondary winding connecting the midpoints of the two arms of the second full bridge; and
    each cell further comprises an output capacitive element between a first output terminal and a second output terminal of the cell, on the secondary circuit side.

12. The converter of claim 9, wherein the secondary circuit of each cell comprises a second set of four chopper switches assembled as a second full bridge, the secondary winding connecting the midpoints of the two arms of the second full bridge.

13. The converter of claim 12, wherein each cell further comprises:
    an output capacitive element between a first output terminal and a second output terminal of the cell, on the secondary circuit side.

14. The converter of claim 13, wherein:
    the primary circuits are series-connected between a first terminal and a second terminal of the converter and the secondary circuits are connected in parallel between a third terminal and a fourth terminal of the converter.

15. A component comprising a plurality of converters of claim 14, the component having at least four connection elements per converter, respectively connected to the first terminal, the second terminal, the third terminal, and the fourth terminal of the converter.

16. A component comprising a plurality of converters of claim 1, the component having at least four connection elements per converter, respectively connected to a first terminal, a second terminal, a third terminal, and a fourth terminal of the converter.

17. A method of controlling a voltage converter comprising a plurality of bidirectional conversion cells, each cell comprising a primary circuit and a secondary circuit isolated from the primary circuit, and being capable of being individually and dynamically activated or deactivated via at least one activation switch of the cell to adjust the transformation ratio of the voltage controller, an input capacitive element between a first input terminal and a second input terminal of the cell, on the primary circuit side; and a configuration circuit for driving the at least one activation switch powered with the voltage across said input capacitive element the method comprising the step of:
    simultaneously controlling activated cells to transfer electric power from the primary circuit to the secondary circuit, and non-activated cells to transfer electric power from the secondary circuit to the primary circuit.

* * * * *

UNITED STATES PATENT AND TRADEMARK OFFICE
CERTIFICATE OF CORRECTION

PATENT NO. : 9,570,987 B2  
APPLICATION NO. : 14/380126  
DATED : February 14, 2017  
INVENTOR(S) : Hieu Trinh et al.

Page 1 of 1

It is certified that error appears in the above-identified patent and that said Letters Patent is hereby corrected as shown below:

On the Title Page

Please correct the names of the Assignees as below:

Please delete:
"Institute Polytechnique de Grenoble, Grenoble (FR); Centre National de la Recherche Scientifique, Paris (FR); Univeriste Joseph Fourier, Grenoble (FR)"

And insert:
--Institut Polytechnique de Grenoble, Grenoble (FR); Centre National de la Recherche Scientifique, Paris (FR); Universite Joseph Fourier, Grenoble (FR)--

Signed and Sealed this
Twenty-second Day of May, 2018

Andrei Iancu
*Director of the United States Patent and Trademark Office*